June 7, 1955

G. R. STIBITZ 2,710,142

FILM TYPE OF SLIDE RULE

Filed Aug. 13, 1946

INVENTOR,
George R. Stibitz
BY Darly & Darly
ATTORNEYS,

June 7, 1955  G. R. STIBITZ  2,710,142
FILM TYPE OF SLIDE RULE
Filed Aug. 13, 1946  4 Sheets-Sheet 2

INVENTOR
George R. Stibitz
BY Darby & Darby
ATTORNEYS,

June 7, 1955 G. R. STIBITZ 2,710,142
FILM TYPE OF SLIDE RULE
Filed Aug. 13, 1946 4 Sheets-Sheet 4
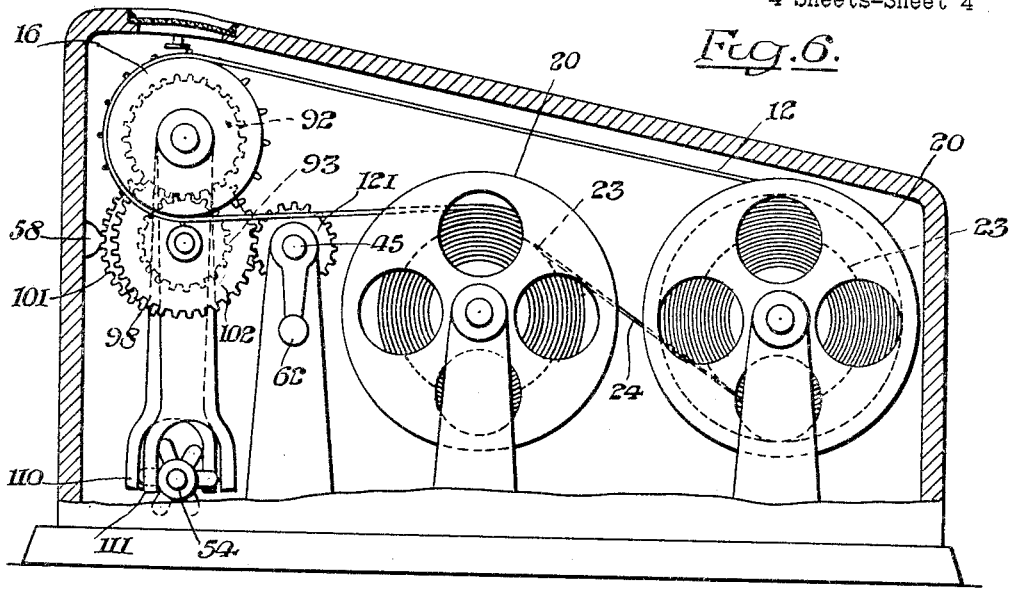
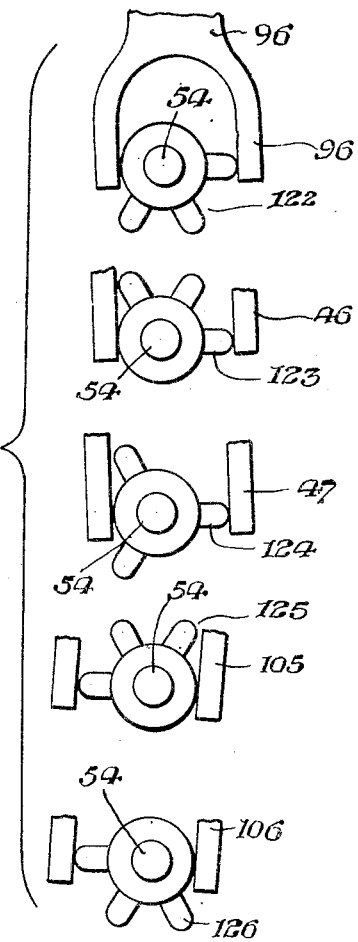
Inventor
George R. Stibitz
by his Attorneys,
Darby & Darby United States Patent Office 2,710,142
Patented June 7, 1955

2,710,142
FILM TYPE OF SLIDE RULE
George R. Stibitz, Burlington, Vt.

Application August 13, 1946, Serial No. 690,246

17 Claims. (Cl. 235—71)

The present invention relates to slide rules and particularly to that type of slide rule in which the scales are marked on movable film strips.

More particularly still the invention relates to a film slide rule having a plurality of item entering scales and one or more result scales.

In the past all film slide rules of which I am aware required the reading of the result from one of the item entering scales and thus necessitated the return of the scales to a zero reference point prior to each performance of a computation on the rule. By my present invention the necessity for resetting the scales to zero is obviated and, consequently, the rule is much more advantageous to use than any of those previously suggested.

It is an object of my invention to provide a film slide rule having a plurality of item entering films or tapes and at least one result film.

It is another object of my invention to produce a rule such as that mentioned above so organized that there is no necessity for resetting the films to a zero reference point at any time during the operation of the device.

It is another object of my invention to provide a film slide rule in which one or more result films partake of the movement of predetermined combinations of the item films and in which the movement of the item films is controlled by the operator.

It is a still further object of my invention to provide a film slide rule of the type mentioned in which the films are perforated and engage sprocket wheels for positive drive thereby.

It is a still further object of my invention to provide means for tensioning the films or tapes so that no slack will be present therein.

It is a still further object of my invention to provide means for connecting the various item entering films with the driving mechanism so that they may be driven under control of the operator.

Other objects and features of the invention will appear when the following description is considered in connection with the annexed drawings, in which—

Figure 6 is a side elevation of the embodiment of the invention illustrated in Figure 5, the housing having been broken away in order to show the operating mechanism; and Figure 7 is an exploded view of the controlling cam shaft and the cams thereon illustrating the manner of selecting the various scales for coupling to the driving mechanism.

Figure 1:
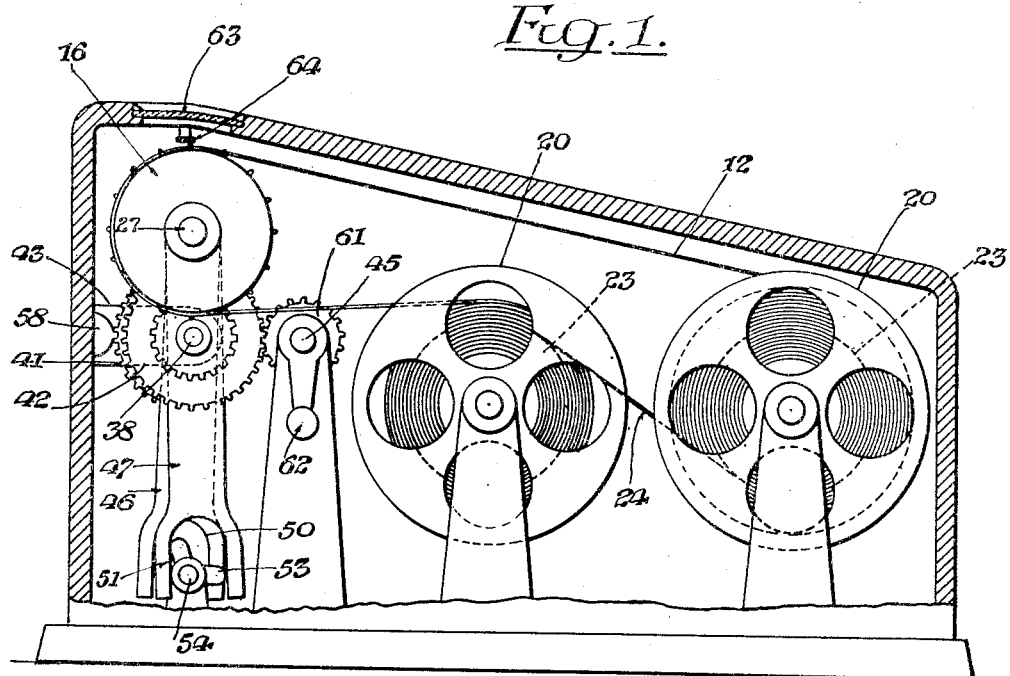
Figure 1 is a side elevation of a preferred form of the device of my invention having three film scales; other numbers of scales may of course be utilized. In this figure the housing has been broken away in order to show the operating mechanism.

Referring now to the drawings, there are provided a plurality of scales, 10, 11 and 12 of which scales 11 and 12 are the item entering scales and scale 10 is the result scale. Each of the scales 10, 11 and 12 is, in the preferred form of the invention, a length of film having marked thereon graduations in accordance with the type of problem for which the machine is to be used. For example, if the machine is to be used for the performance of simple multiplications the scales will be logarithmic while if the machine is to be utilized for the solution of problems involving quadratic functions such, for example, as $Z^2 = X^2 + Y^2$ then the scales will be "square" scales. In some instances the scales might be linear and under these circumstances position indicating means or scales other than films might be utilized such, for example, as counters.

The films 10, 11 and 12 are provided with perforations 13 and the scales are laid out on the films in accordance with the distance between perforations so that any subsequent variation in the overall length of the films will not have an appreciable effect on the accuracy of the results procured, since the position of the film is corrected at each sprocket hole. The perforations 13 of films 10, 11 and 12 cooperate respectively with the teeth of sprocket wheels 14, 15 and 16. Likewise films 10, 11 and 12, respectively, are wound on the pairs of storage reels 17, 18 and 20 being drawn from one of the pair of reels and wound upon the other as the tapes are moved in either direction. Each pair of reels 17, 18 and 20 is provided with a pair of auxiliary reels 21, 22 and 23. Between each pair of auxiliary reels extends an elastic tape 24, 25 or 26, these tapes being wound on both reels of the pair in such a manner that they exert a constant tension to take up the films in both directions so that there will be no slack in any of the films at any time.

The sprocket wheels 14, 15 and 16 are rotatably mounted upon a shaft 27 which shaft is suitably supported in the housing 28. Integral with each sprocket wheel 14, 15 and 16 is a gear 30, 31 or 32. Gears 30, 31 and 32 mesh respectively with gears 33, 34 and 35 which latter three gears are loosely mounted upon stub shafts 36, 37 and 38, respectively. Integral with the gears 33, 34 and 35 are gears 40, 41 and 42, respectively, these gears thus being likewise rotatably supported on the stub shafts 36, 37 and 38 respectively.

Stub shaft 36 is, in the present instance, illustrated as supported by the arm 43 extending from the housing 28. This shaft is so supported that the gear 40 is always in mesh with a gear 44 mounted on the driving shaft 45. Stub shafts 37, and 38 are each supported in a depending arm 46 or 47 respectively, these arms being pivotally mounted on shaft 27 each being adjacent to the corresponding gear 31 or 32. Arms 46 and 47 terminate at their lower ends in bifurcated extensions 50 and 51, respectively. Operating between the bifurcations 50 and 51, of the arms 46 and 47 are cams 52 and 53 which cams are fixedly mounted on a shaft 54 suitably supported in the housing 28 and carrying at one end an operating handle 55 which is limited in its movement by means of the pins 56. Fixed to the housing 28 adjacent each gear 41 or 42 is a dog 57 or 58, these dogs comprising single gear teeth adapted to prevent movement of the gears 41 and 42 when the corresponding arm 46 or 47 is in one of its two possible positions. The construction is such that the gear wheel 41 will engage the dog 57 before it disengages from the cooperating driving gear 60 and likewise gear 42 will engage the dog 58 prior to its disengagement from the corresponding driving gear 61.

The driving gears 44, 60 and 61 are fixedly mounted on the drive shaft 45 which shaft is provided with the operating handle 62 which may be operated in either direction.

Figure 2:
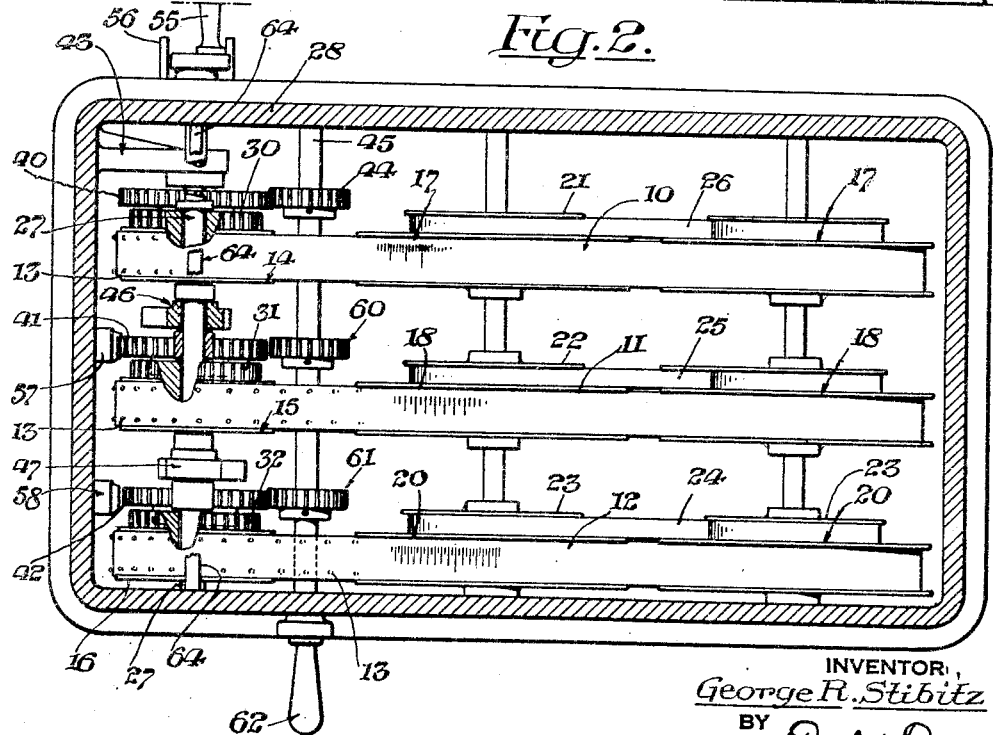
Figure 2 is a top plan view of the mechanism of Figure 1 the cover again having been removed in order to more clearly show the interior parts. Likewise in this view certain parts have been broken away in order to more clearly illustrate the construction.
Figure 3:
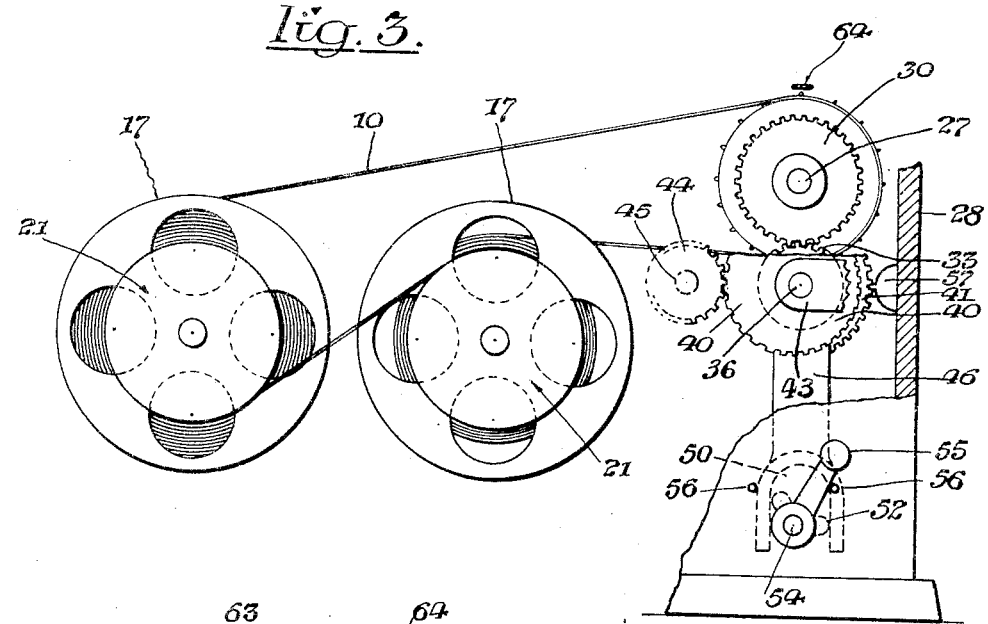
Figure 3 is a fragmentary view generally similar to Figure 1 but taken from the opposite side of the device and showing particularly the operating means for the cam shaft.
Figure 4:
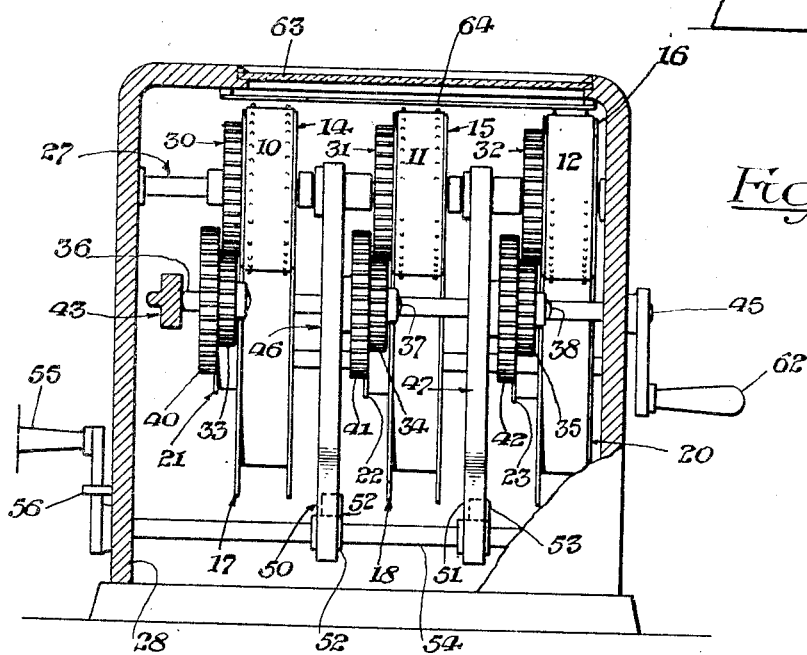
Figure 4 is an elevation taken from the left of the machine as seen in Figure 2 illustrating the position of the various parts. In this view the housing has again been broken away.

A window 63 is provided in the housing 28 so that the position of the tapes may be read with respect to a fixed reference mark indicated in the drawing at 64 (see Figure 2). The window 63 and mark 64 are above the sprockets so that any slack does not affect the reading.

In operating the device, the cam shaft control handle 55 is moved to one of its two positions, for example to the position in which gear 42 meshes with gear 61. With the cam in this position drive shaft 45 is operated (through the medium of handle 62) in accordance with one of the factors of the problem being solved and thereby tape or film 12 is moved until the proper graduation appears opposite the fixed or fiduciary mark 64. Since the stub shaft 36 has a single position (in which the gear 40 is in mesh with the gear 44), the film 10 will be correspondingly moved. After this factor of the problem has been entered the control handle 55 is operated to its alternate position and the second factor is entered in the machine. Since at this time gear 42 will be out of mesh with its driving gear 61 and held in a fixed position by means of the cooperating dog 58, no movement of tape 12 will occur. However, at this time, since gear 41 will be in mesh with its driving gear 60, tape or film 11 will be driven and, of course, tape 10 will partake of this movement in view of the constant meshing of the gear 40 associated therewith with the driving gear 44. Tape 11 will be moved until the factor to be entered is in register with the fixed reference mark 64. The answer to the problem will then appear on the result film 10 beneath the fixed mark 64.

Figure 5:
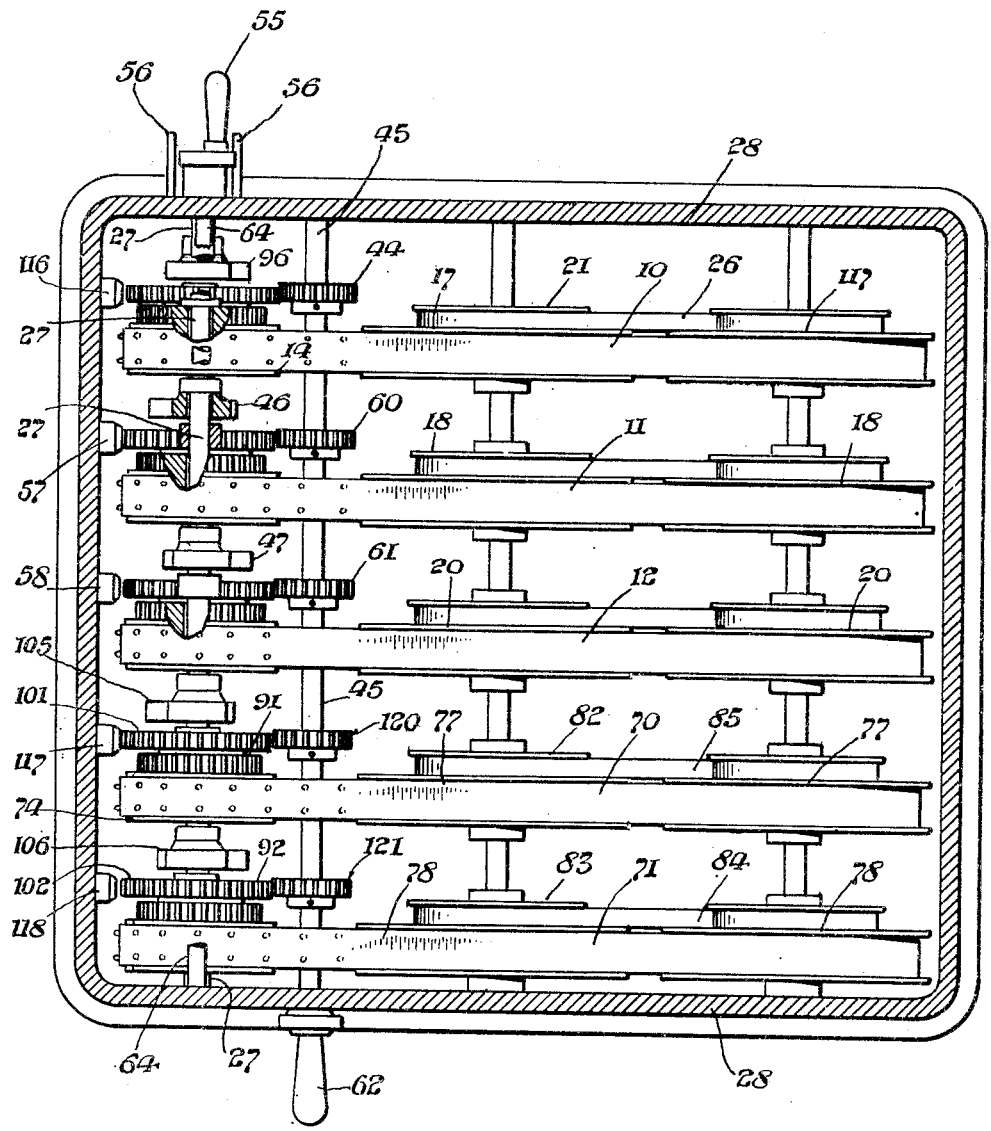
Figure 5 is a top plan view of the second embodiment of my invention illustrating the use of five film scales rather than three shown in Figure 1 and illustrated likewise is the mechanism for coupling the various scales selectively to the driving mechanism.

A second embodiment of my invention is shown in Figures 5, 6 and 7. Since this second embodiment includes the mechanism previously described, and comprising the three film scales 10, 11, 12 and their driving mechanism, the reference characters previously utilized have been again applied to these figures. In addition to the mechanism above-mentioned and already described there are provided two additional tapes 70 and 71 which tapes are mounted upon reels 77 and 78 respectively being drawn from one of the pair of reels and wound upon the other as the tapes are moved in either direction. Each pair of reels 77 and 78 is provided with an auxiliary pair of reels 82 and 83. Between each pair of auxiliary reels there extends an elastic tape 85 and 84, these tapes being wound on both reels of each pair in the same manner as the tapes 24, 25 and 26 and so that they exert a constant tension to take up the films in both directions so that there will be no slack in any of the films at any time.

Sprocket wheels 74 and 75, similar to sprocket wheels 14, 15 and 16 are, like these sprocket wheels, rotatably mounted upon the shaft 27 which shaft is pivotally supported in the housing 28. Integral with each sprocket wheel 74 or 75 is gear 91 and 92 respectively. Gears 91 and 92 mesh with gears 93 and 94 which gears are loosely mounted on stub shafts 97 and 98. Stub shafts 97 and 98 are supported on the pivotally mounted arms 105 and 106 which arms depend from the shaft 27 and terminate at their lower ends in bifurcated extensions 110 and 111 respectively.

Whereas in the three-scale arrangement previously described the gear 40 and the gear 33 were supported on the stub shaft 36 fixed to the bracket 43 extending from the housing 28, these gears are, in this embodiment of the invention, rotatably mounted on a stub shaft 97 which is in turn mounted on arm 96 depending from the shaft 27 in the same manner as do arms 46, 47, 105 and 106.

The above-described mounting of gears 33 and 40 makes it possible to disengage gear 40 from the drive shaft gear 44 and therefore a dog 116 is fixed to the housing in order to prevent movement of the gear 40 when the corresponding arm 96 is in one (the left hand one as seen in Figure 6) of its two possible positions. As described heretofore in connection with the gears 41 and 42 the construction is such that the gear wheel 40 will engage the dog 116 before it disengages from the cooperating driving gear 44. In a similar manner dogs 117 and 118 are provided for the gears 101 and 102 and are so arranged that gears 101 and 102 engage the dogs 117 and 118 respectively before they disengage from the corresponding driving gears 120 and 121. The driving gears 44, 60, 61, 120 and 121 are all fixedly mounted on the driving shaft 45 which shaft is provided with the operating handle 62 which may, as before, be operated in either direction.

In this embodiment of the invention the cam shaft 54 is provided with five cams cooperating respectively with the pivotally mounted arms 96, 46, 47, 105 and 106, these cams lying within the bifurcated ends of the respective arms the cams being designated 122, 123, 124, 125, 126. Whereas in the first embodiment of the invention the similar cams 52 and 53 were provided with two camming surfaces each in order to place the corresponding arms in either of two positions and were so oriented that one arm is always in a forward position and the other is in a rearward position, the cams 122 through 126 are provided with three camming surfaces or pins each, in order to provide for moving the five arms into their alternate positions in a number of combinations. For example, in one position of the cam shaft 54 (with the shaft 54 moved through 60° in a clockwise direction from the position shown in Figure 7) arms 46 and 105 are moved to the right so that their respective gears 41 and 102 move into engagement with the driving gears 60 and 120 and arms 96, 47 and 106 move to the left so that their respective gears 40, 42 and 102 are engaged with stops 116, 58 and 118 and disengaged from the driving gears 44, 61 and 121. In a second position of cam shaft 54 (that shown in Figure 7) arms 96, 46 and 47 are moved to the right to put their individual gears into contact with respective driving gears, the remaining arms being moved to the left to cause the corresponding gears to disengage their respective driving gears and engage the respective dogs. In the third position (with cam shaft 54 rotated through 60° in a counterclockwise direction from the position indicated in Figure 7) arms 96 and 106 are moved to the right to cause driving engagement between drive shaft 45 and the respective film slides 10 and 71 and the remaining arms are moved to the left to cause disengagement of the respective films from the drive shaft.

The five-film scale device of Figures 5 through 7 described hereinabove is particularly applicable to the solution of simple trigonometric problems although by changing the cam arrangement and the scales various other problems may be solved.

In one machine adapted to the solution of problems in triangulation the five-scales were graduated in the following manner:

Scale 10—logarithmic scale 200 to 20,000
Scale 11—logarithmic scale 200 to 20,000
Scale 12—logarithmic scale 200 to 20,000
Scale 70—log sine scale 10 to 1600 mils
Scale 71—log cosine scale 30 to 1590 mils Note that 1 mil=1/6400 of 360°.

As has been explained above when the cam shaft positions were described, in one position scales 11 and 70 move together and scales 10, 12 and 71 are locked in stationary position; in a second position of the cam shaft 54 scales 10, 11 and 12 move together and scales 70 and 71 are locked; while in the third position scales 10 and 71 turn together and scales 11, 12 and 70 are locked.

The operation of the device can perhaps best be described by the use of an illustrative example. Let us therefore consider a right triangle one side of which (hereinafter designated A) has a length of 7071.0, the angle adjacent to this side hereinafter designated β having a value of 800.0 mils. Solving this problem for the hypotenuse and opposite side of the triangle (respectively designated B and C) the following procedure is utilized: Cam shaft 54 is set to position I and scale 70 moved until 800.0 appears beneath the fiduciary mark 64. Since scale 70 is coupled to scale 11 the latter scale will have been moved through the same distance.

Cam shaft 54 is now shifted to position III, that is, the position in which scales 10 and 71 are driven by the drive shaft 45, and the value 800.0 is set on scale 71, thereby moving scale 10 through a distance representative of log cosine 800.0 mils.

Cam shaft 54 is now shifted to position II and the value 7071.1 set on scale 10. Since with this cam shaft position scales 10, 11 and 12 are coupled together, these scales will be moved through a distance equivalent to the difference between log 7071.1 and log cosine 800.0 or log $A - \log \cos \beta$. Scale 11 has already set thereon the log sin of β so that its final position will be the antilog of $\log A + \log \sin \beta - \log \cos \beta$. Therefore the value read on scale 11 will be the value of $A \tan \beta$, which is the length of B, the side opposite the angle β.

Scale 12 had no value set thereon until it was moved through the distance $\log A - \log \cos \beta$. Therefore the antilog read on scale 71 at the fiduciary mark 64 will be the value of $$\frac{A}{\cos \beta}$$

which is the length of the hypotenuse C of the triangle. Thus the two unknown sides are solved for and become known, the values being respectively 7071.1 for side B and 10,000 for side C.

By properly operating the device of Figure 5, by positioning the cam shaft 54 in its various operating positions in different orders, the problems in triangulation may be solved whether one known quantity is the hypotenuse or either of the two sides with the other known quantity the angle β. Thus the problem described in detail above involved the finding of the hypotenuse and the side opposite the angle β given the side adjacent the angle and the angle β itself. If the problem is to be solved with the angle given and the side opposite the angle β also given, it is done by setting the angle β on scale 70 while the cam shaft 54 is in position I, next setting angle β on scale 11 with the cam shaft 54 in position II, then reading the answer C on scale 12, next setting cam shaft 54 to position III, setting β on scale 71 and reading the side A on scale 10. In a similar manner the remaining four problems may be solved by varying the order of procedure in the manner set forth in the following chart:

| | | | | | |
|---|---|---|---|---|---|
| Pos.I: Set β on 70—Pos.II: Set C on 12, Ans. B on 11— Pos.III: Set β on 71. | Ans. A | Ans. B | Given C | Given β | Given β |
| Pos.II: Set C on 12—Pos.III: Set A on 10, Ans. β on 71— Pos.I: Set β on 70. | Given A | Ans. B | Given C | Set β | Ans. β |
| Pos.II: Set C on 12—Pos.I: Set B on 11, Ans. β on 70— Pos.III: Set β on 71. | Ans. A | Given B | Given C | Ans. β | Set β |
| Pos.II: Set B on 12—Pos.III: Set A on 10, Ans. β on 71— Pos.I: Set β on 70. | Given A | Ans. C | Given B | Set β | Ans. β |

The cam arrangement on cam shaft 54 may of course be modified in many other manners. For example, in one position scale 10 may be coupled to scale 12, in the second position scales 10 and 11 may be coupled to scale 70, and in a third position scale 11 may be coupled to scale 71. With this arrangement factor A may be inserted in logarithmic scale 12 and at the same time into an identical logarithmic scale 10. Next a factor B may be inserted into scale 70 and, due to the coupling, likewise to scales 10 and 11 and in a third step a factor C may be inserted into scale 71 and scale 11 moved correspondingly. The result will therefore be that the reading of scale 10 will yield the product AB while from scale 11 may be read the product BC.

While I have described in considerable detail two embodiments of my invention, it will be obvious that modifications may be made in both embodiments to permit the solving of equations of different characters, for example, the scales of the second embodiment may be square scales rather than logarithmic scales and therefore problems in quadratic equations may be solved on this five-scale device as well as on the three-scale device previously described. I wish, therefore to be limited not by the foregoing description which is given solely for the purpose of illustration, but on the contrary, to be limited only by the claims granted to me.

What is claimed is:

1. In a calculating device of the slide rule type, in combination a plurality of movable scales, an indicating mark fixed with relation to said scales, means for selecting and independently positively driving certain of said scales relative to said fixed mark means for positively driving at least one of said scales with respect to said mark concurrently with said selected scales and thereby through distances equal to the sums of numbers proportional to the distances moved by said selected ones of said scales and means operated by said selecting means for positively holding unselected ones of said scales in fixed position relative to said mark.

2. In a calculating device of the type described, in combination, a plurality of perforated films bearing indicating graduations, means mounting said films in longitudinal alignment, fixed indicating marks cooperating with all said films, means for positively driving said films for movement past said fixed marks, means for selectively coupling a plurality of said films independently and sequentially to said positive driving means, means for positively driving a film other than one of said plurality whenever one of said plurality is driven and means operated by said selecting means for locking unselected and undriven ones of said plurality in fixed position relative to said marks.

3. In a device of the class described, in combination, a housing, a plurality of pairs of reels mounted in said housing, a plurality of films each of said films being wound upon the reels of one of said pairs, perforations in each of said films, sprocket wheels cooperating with said perforations to unwind said films from one reel of a pair and wind it on the other reel of said pair, elastic means for tensioning said films, means for selecting and positively driving the sprocket wheels of a plurality of films independently, and means for driving films other than said plurality whenever one of said plurality of films is driven and thereby causing said other films to move in proportion to the sum of numbers proportional to the movements of said plurality.

4. In a device of the class described, in combination, a housing, a pair of shafts supported in said housing, a plurality of pairs of reels supported on said shafts, a plurality of films each of said films bearing driving perforations and being wound upon the reels of one of said pairs, said films being provided with graduations in accordance with a type of mathematical problem to be solved, said graduations being related to said driving perforations, said pairs of reels and films being arranged in a side-to-side relationship, a fixed mark supported by said housing and cooperating with all said films, means cooperating with said driving perforations for unwinding each of said films from one of the cooperating pairs of reels and winding it upon the other of said pair, means under the control of an operator for positively driving said winding means, means under control of the operator for coupling said positive driving means to selected ones of said winding means, means permanently connecting one of said winding means to said positive driving means, whereby said one of said films is unwound from its reel and moved past said fixed mark whenever any other of said films is unwound from its reel and moved past said fixed mark and means operated by said coupling means for holding unselected ones of said winding means in fixed position relative to said mark.

5. In a calculating device of the class described, in combination, a plurality of item entering films, a plurality of result films, a fixed indicating mark cooperating with all said films, means for selecting and positively moving said item entering films independently with respect to said fixed mark, and means for selecting and positively moving each of the said result films with respect to said fixed mark an amount proportionate to the sum of the movements of variable groups of the item entering films.

6. In a calculating device of the class described, in combination, a plurality of interdependent groups of item entering films, a plurality of result films, one for each group of item entering films, a fixed indicating mark cooperating with all said films, means for selecting and positively moving said item entering films independently with respect to said fixed mark, means for selecting and positively moving each of the said result films with respect to said fixed mark an amount proportionate to the sum of the movements of the item entering films of its variable group and means operated by said selecting means for locking unselected ones of said item entering films and unselected ones of said result films in fixed position relative to said mark.

7. In a calculating device, in combination, a plurality of films each bearing graduations in accordance with a mathematical problem to be solved, a plurality of pairs of reels, one pair for each of said films, a plurality of sprocket wheels, one for each of said films, said sprocket wheels being adapted to cause unwinding of a film from one of said reels of a pair and winding said film on the other reel of the pair, means wound upon one of the reels of a pair and extending to the other to cause tension to be applied to said films, means comprising gears for driving said sprocket wheels, a cam shaft, a driving shaft, and means under control of said cam shaft to couple said sprocket gears to said drive shaft.

8. In a calculating device of the slide rule type, in combination, a plurality of item entering films, a result film, a fiduciary mark cooperating with said films, perforations in said films, sprocket wheels cooperating with said perforations for moving said films past said fiduciary mark, a shaft on which said sprocket wheels are rotatably mounted, a gear integral with each said sprocket wheel, a drive shaft having a gear thereon for each said sprocket wheel, means to engage the gear of each said item entering film with its cooperating driving means maintaining said sprocket gear and driving gear of said result film in mesh whereby all movements of any item entering film are imparted to said result film, and means operated by said gear engaging means to prevent movement of unengaged sprocket gears.

9. In a calculating device of the slide rule type, in combination, a plurality of item entering films, a result film, a fiduciary mark cooperating with said films, perforations in said films, sprocket wheels cooperating with said perforations for moving said films past said fiduciary mark, a shaft on which said sprocket wheels are rotatably mounted, a gear integral with each said sprocket wheel, a drive shaft having a gear thereon for each said sprocket wheel, a gear intermediate each said drive shaft gear and sprocket wheel gear, means to engage the last mentioned gear of each said item entering film with its cooperating driving gear, a fixed dog cooperating with each said intermediate gear to hold it in fixed position when disengaged from its driving gear and means maintaining said sprocket gear and driving gear associated with said result film in mesh, whereby all movements of said item drive gears are imparted to said result drive gear.

10. In a calculating device of the slide rule type, in combination, a plurality of item entering films, a result film, a fiduciary mark cooperating with said films, perforations in said films, sprocket wheels cooperating with said perforations for moving said films past said fiduciary mark, a shaft on which said sprocket wheels are rotatably mounted, a gear integral with each said sprocket wheel, a drive shaft having a gear thereon for each said sprocket wheel, a gear intermediate each said drive shaft gear and sprocket wheel gear, means mounting said last mentioned gears of the result film in permanent engagement wtih said drive shaft gear and sprocket wheel gear, an arm pivoted on said sprocket wheel shaft adjacent each sprocket wheel gear of the item entering films, means mounting said intermediate gears on said arms, and cam mean for oscillating said arms about said shaft to engage and disengage said intermediate gears of the item entering films with the corresponding drive shaft gears.

11. In a calculating device of the slide rule type, in combination, a plurality of item entering films, a result film, a fiduciary mark cooperating with said films, perforations in said films, sprocket wheels cooperating with said perforations for moving said films past said fiduciary mark, a shaft on which said sprocket wheels are rotatably mounted, a gear integral with each said sprocket wheel, a drive shaft having a gear thereon for each said sprocket wheel, a gear intermediate each said drive shaft gear and sprocket wheel gear, means mounting said last mentioned gears of the result film in permanent engagement with said drive shaft and sprocket wheel gear, an arm pivoted on said sprocket wheel shaft adjacent each sprocket wheel gear of the item entering films, means mounting said intermediate gears on said arms and a dog in fixed position cooperating with each intermediate gear of the item entering films and engageable by said intermediate gear prior to disengagement of said gear from the corresponding drive shaft gear.

12. In a calculating device of the slide rule type, in combination, a plurality of movable scales, an indicating mark fixed with relation to said scales, a manually operated drive shaft, gear means for positively driving certain of said scales relative to said fixed mark, said gear means including one gear train in constant engagement for positively driving one of said scales with respect to said mark through distances equal to the sums of numbers proportional to the distances moved by others of said scales, and cam means for engaging gear trains of said other scales with said drive shaft.

13. In a calculating device of the slide rule type, in combination, a plurality of movable scales, an indicating mark fixed with relation to said scales, a manually operated drive shaft, gear means for positively driving certain of said scales relative to said fixed mark, said gear means including one gear train in constant engagement for positively driving one of said scales with respect to said mark through distances equal to the sums of numbers proportional to the distances moved by others of said scales, and cam means for engaging gear trains of said other scales with said drive shaft, said cam means also serving to lock unengaged gear trains in fixed positions.

14. In a calculating device of the slide rule type, in combination, a plurality of item entering films, a result film, a fiduciary mark cooperating with said films, perforations in said films, sprocket wheels cooperating with said perforations for moving said films past said fiduciary mark, a shaft on which said sprocket wheels are rotatably mounted, a gear integral with each said sprocket wheel, a drive shaft having a gear thereon for each said sprocket wheel, arms depending from said sprocket wheel shaft, gears mounted on each said arm, one of said last-mentioned gears being constantly engaged with said sprocket wheel gear and the other being fixed to said first gear wheel for rotation therewith and being movable into and out of engagement with the associated gear on said drive shaft, and cam means operating upon said arms to engage certain of said gears associated with said item entering films with corresponding gears on said drive shaft.

15. In a calculating device of the slide rule type, in combination, a plurality of item entering films, a result film, a fiduciary mark cooperating with said films, perforations in said films, sprocket wheels cooperating with said perforations for moving said films past said fiduciary mark, a shaft on which said sprocket wheels are rotatably mounted, a gear integral with each said sprocket wheel, a drive shaft having a gear thereon for each said sprocket wheel, arms depending from said sprocket wheel shaft, gears mounted on each said arm, one of said last-mentioned gears being constantly engaged with said sprocket wheel gear and the other being fixed to said first gear wheel for rotation therewith and being movable into and out of engagement with the associated gear on said drive shaft, cam means operating upon said arms to engage certain of said gears associated with said item entering films with corresponding gears of said drive shaft, and dogs fixed to said housing in the path of movement of said gears on said swinging arms to lock said gears when said cam means is operated to disengage said gears from the corresponding drive shaft gears.

16. In a calculating device of the slide rule type, in combination, a plurality of item entering films, a plurality of result films, a fiduciary mark cooperating with said films, perforations in said films, sprocket wheels cooperating with said perforations for moving said films past said fiduciary mark, a shaft on which said sprocket wheels are rotatably mounted, a gear integral with each said sprocket wheel, a drive shaft having a gear thereon for each said sprocket wheel, arms depending from said sprocket wheel shaft, gears mounted on each said arm, one of said last-mentioned gears being constantly engaged with said sprocket wheel gear and the other being fixed to said first gear wheel for rotation therewith and being movable into and out of engagement with the associated gear on said drive shaft, and cam means operating upon said arms to engage certain of said gears associated with said films with corresponding gears on said drive shaft.

17. In a calculating device of the slide rule type, in combination, a plurality of item entering films, a plurality of result films, a fiduciary mark cooperating with said films, perforations in said films, sprocket wheels cooperating with said perforations for moving said films past said fiduciary mark, a shaft on which said sprocket wheels are rotatably mounted, a gear integral with each said sprocket wheel, a drive shaft having a gear thereon for each said sprocket wheel, arms depending from said sprocket wheel shaft, gears mounted on each said arm, one of said last-mentioned gears being constantly engaged with said sprocket wheel gear and the other being fixed to said first gear wheel for rotation therewith and being movable into and out of engagement with the associated gear on said drive shaft, cam means operating upon said arms to engage certain of said gears associated with said films with corresponding gears of said drive shaft, and dogs fixed to said housing in the path of movement of said gears on said swinging arms to lock said gears when said cam means is operated to disengage said gears from the corresponding drive shaft gears.

References Cited in the file of this patent

UNITED STATES PATENTS

| | | |
|---|---|---|
| 995,466 | Jones | June 20, 1911 |
| 1,084,668 | Tallmadge | Jan. 20, 1914 |
| 1,439,904 | Lockwood | Dec. 26, 1922 |
| 1,777,692 | Fuss | Oct. 7, 1930 |
| 2,143,892 | Ludecke et al. | Jan. 17, 1939 |
| 2,285,774 | Horner | June 9, 1942 |
| 2,289,257 | Fiala | July 7, 1942 |
| 2,454,987 | Brandner | Nov. 30, 1948 |

FOREIGN PATENTS

| | | |
|---|---|---|
| 370,993 | Germany | Mar. 9, 1923 |
| 285,322 | Great Britain | Feb. 16, 1928 |
| 471,113 | Germany | Feb. 9, 1929 |
| 747,394 | France | Mar. 28, 1933 |